United States Patent [19]
Wreesmann et al.

[11] Patent Number: 4,959,448
[45] Date of Patent: Sep. 25, 1990

[54] LIQUID CRYSTALLINE SIDE-CHAIN POLYESTERS PREPARED BY POLYCONDENSATION REACTIONS

[75] Inventors: Carel T. J. Wreesmann, Arnhem; Erwin W. P. Erdhuisen, Duiven, both of Netherlands

[73] Assignee: Akzo N.V., Netherlands

[21] Appl. No.: 373,373

[22] Filed: Jun. 29, 1989

[30] Foreign Application Priority Data

Jul. 4, 1988 [NL] Netherlands .......................... 8801681

[51] Int. Cl.$^5$ ...................... C08G 63/02; C08G 63/60
[52] U.S. Cl. .................................... 528/192; 528/176; 528/183; 528/191; 528/194
[58] Field of Search ............... 528/176, 183, 191, 192, 528/194

[56] References Cited

U.S. PATENT DOCUMENTS 4,717,757  1/1988  Dubois et al. .................. 526/246
4,757,130  7/1988  De Martino .................... 528/288

FOREIGN PATENT DOCUMENTS 0194747  2/1986  European Pat. Off. .
0241338  3/1987  European Pat. Off. .
3603267  6/1987  Fed. Rep. of Germany .

OTHER PUBLICATIONS

ACS Symposium Series 233, American Chemical Society, Washington, DC 1983.
Angew. Chemie Int. Ed., 23 690 (1984).
J. J. Thackera et al., Appl. Phys. Lett. 52 1031–1033 (1988).
A. C. Griffin, SPIE vol. 682, p. 65 (1986).
Katz et al., J. Am. Chem. Soc. 109 6561 (1987).
A. Franke et al., Synthesis (1979) pp. 712–714.
D. H. Wadsworth et al., Journal of Organic Chemistry, vol. 30, (1965), pp. 680–685.
Chemical Abstracts 107:22608t.
Oudar et al., J. Chem. Phys. 67 446 (1977).
G. R. Möhlmann et al., 1989 Technical Digest Series, vol. 2 (Topical Meeting on Non-Linear Guided Wave Phenomena), Optical Society of America, Washington, D.C. 1989, pp. 171–174.
S. Esselin et al., Proc. SPIE's Symposium on Optical & Optoelectronic Applied Science & Engineering, San Diego (1988).
D. J. Williams, "NLO Properties of Organic Molecules & Crystals", vol. 1, pp. 427–429 (1987).

*Primary Examiner*—Harold D. Anderson
*Assistant Examiner*—T. Mosley
*Attorney, Agent, or Firm*—David H. Vickrey; Louis A. Morris

[57] ABSTRACT

Liquid crystalline side-chain polyesters prepared by polycondensing a dicarboxylic acid or a derivative thereof with a diol of a certain general formula. Of such diols the essence is that they have a delocalized $\pi$ electron system to which both an electron donor group and an electron acceptor group are coupled directly (D$\pi$A-system). Because of the structure of the diol to which the D$\pi$A-system is linked the polyesters exhibit excellent Tg and Tc values. The polyesters are to be used in optical waveguides or for optical data storage.

9 Claims, No Drawings

LIQUID CRYSTALLINE SIDE-CHAIN POLYESTERS PREPARED BY POLYCONDENSATION REACTIONS

BACKGROUND OF THE INVENTION

The invention pertains to liquid crystalline side-chain polyesters prepared by polycondensing a dicarboxylic acid or a derivative thereof with diols of a certain general formula. Such diols display a molecular hyperpolarizability $\beta$ of the order of $10^{-38}$ m$^4$/V. The phenomenom of molecular hyperpolarizability and the related non-linear optical (NLO) effects (Pockel's effect and second harmonic generation) are described in ACS Symposium Series 233, American Chemical Society, Washington, D.C., 1983, and in Angew, Chem. 96 637-51 (1984).

Generally, hyperpolarizable molecules have a delocalized $\pi$ electron system to which both an electron donor group and an electron acceptor group are coupled directly (D$\pi$A system).

Polymers having hyperpolarizable side groups may be subjected to polar orientation in an electric field. As a result, the material also becomes macroscopically hyperpolarizable.

Such material may be used in an optical switch, in which case an electric circuit is provided on a hyperpolarizable polymer. Such a use is described by J. J. Thackera et al., Appl. Phys. Lett. 52 1031-33 (1988).

The invention relates to liquid crystalline side-chain polyesters obtained by polycondensing a dicarboxylic acid or a derivative thereof with a diol of the formula:

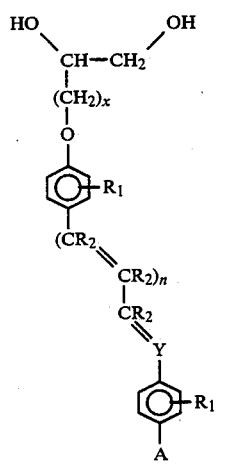

wherein $R_1$=halogen, $R_2$, $OR_2$, $COR_2$, $COOR_2$, CN[B] or $CF_3$;
$R_2$ =H or an alkyl group having 1-3 carbon atoms;
Y=$CR_2$, C—CN, or N;
A=CN, $NO_2$, CH=C(CN)$_2$,

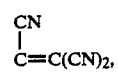

or $CF_3$;
n=0-4; and
x=0-6.

The groups $R_1$ at the two benzene rings are not necessarily identical. This also applies to the groups $R_2$ at the double bonds.

The essence of the polyesters according to the invention is that they are prepared from diols having a D$\pi$A system. The group at the benzene ring ($R_1$) is not of vital importance here. Only if there should be a fluorine substituent at the ring to which the acceptor A is also coupled may, on the strength of European Patent Specification No. 0 241 338, a real effect be expected on the macroscopic hyperpolarizability following the incorporation of the diol in a polymer. When selecting substituents at the double bond it should be kept in mind that the D$\pi$A system must not be forced out of planarity. If it is sterically forced out of planarity slightly by, for instance, a t-butyl group, then the hyperpolarizability may be influenced negatively.

Further, the polyesters according to the invention are particularly suitable as a medium for optical wave guides and for optical data storage. In general, the use of liquid crystalline side-chain polymers for optical data storage is known from DE No. 3603267, which disclosure is incorporated herein by reference. In this respect the values of Tg (glass transition temperature) and Tc (clearing temperature) are of importance.

Tc is a concept known to the artisan and is used to characterize the thermodynamic stability of a liquid crystalline phase. It marks the transition from the anisotropic to the isotropic liquid phase.

SUMMARY OF THE INVENTION

The invention is a polyester comprised of the polyester polycondensation product of a dicarboxylic acid or a derivative thereof with a diol of the formula:

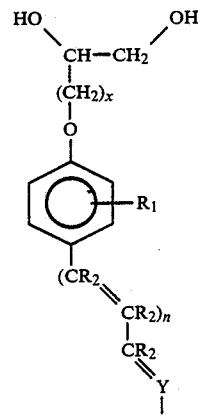

wherein $R_1$ is halogen, $R_2$, $OR_2$, $COR_2$, $COOR_2$, CN[B] or $CF_3$;
$R_2$ H or an alkyl group having 1-3 carbon atoms;
Y is $CR_2$, C—CN or N;
A is CN, $NO_2$, CH=C(CN)$_2$,

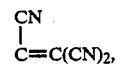

or $CF_3$;
n is 0-4; and
x is 0-6.

DETAILED DESCRIPTION OF THE INVENTION

The present invention is a polyester comprised of the polycondensation product of a dicarboxylic acid or a derivative thereof with a diol of the formula:

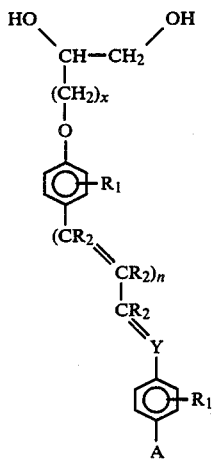

wherein
$R_1$ is halogen, $R_2$, $OR_2$, $COR_2$, $COOR_2$, $CN[B]$ or $CF_3$;
$R_2$ is H or an alkyl group having 1-3 carbon atoms;
Y is $CR_2$, C—CN or N;
A is CN, $NO_2$, $CH=C(CN)_2$,

or $CF_3$;
n is 0-4; and
x is 0-6.

Polyesters containing D$\pi$A groups of the aforementioned type are known from a paper by A. C. Griffin (SPIE Vol. 682, p. 65 (1986)). Such polyesters are prepared by polycondensation of an aliphatic diol with a diester to which a D$\pi$A system is attached.

It is advantageous that the polyesters according to the invention be based on NLO-active diols, as they need not be activated prior to polycondensation. Such activation is required for ester groups, which, for the D$\pi$A diesters described in the above-mentioned publication, means an additional reaction in the presence of the NLO-active group.

Thus, the diols according to the invention may be converted into a polyester by refluxing with a diacid chloride, in, for instance, tetrahydrofuran (THF) for a period of about 1 hour. Polycondensation of the known diesters, on the other hand, requires the use of both a very low pressure and an elevated temperature (170° C.).

The above makes the use of diesters with elongated $\pi$ systems (which exhibit the advantage of having a higher hyperpolarizability density) less attractive. If there are more double bonds, possible rearrangements under the required reaction conditions will cause the NLO activity to decrease.

For synthetic accessibility preference is given to those polyesters that are prepared from a diol of the aforesaid formula wherein the spacer length x=b 1.

In view of their small spacer length it may be considered surprising that these polyesters comprising mesogenically-substituted glycerol moieties are liquid crystalline and exhibit excellent Tg and Tc values. Also in view of the relatively high Tg and Tc values obtained, the polyesters according to the invention preferably are prepared from aliphatic diacids or derivatives and more preferably from glutaryl or adipoyl chloride.

Of course, the polyesters according to the invention may be prepared from mixtures of diacid derivatives. In preparing liquid crystalline polyesters it is allowed that these mixtures partly consist of aromatic dicarboxylic acids (or derivatives thereof). This may serve to raise the Tg of the polyester, but care should be taken that the polyester obtained still is liquid crystalline and has a Tc>Tg. Also, these mixtures may in part contain polyfunctional acid derivatives so as to give a certain degree of branching, with the polymer still remaining processable. Alternatively, it is possible in polycondensation to make use of mixtures of diols, optionally mixed with non-NLO-active diols or polyols. Preferably, the percentage of NLO-active diols which is built into the polyester is high enough to guarantee a hyperpolarizability density of at least $10^{-11}$ m$^4$/V.

By hyperpolarizabilty density is meant according to the invention the product of the number of hyperpolarizable groups per unit of volume and the molecular hyperpolarizability of $\beta_o$ of these groups. The $\beta_o$ value indicates the molecular hyperpolarizability extrapolated to a frequency of zero. This is described by Katz et al. in J. Am. Chem. Soc. 109 6561 (1987).

The invention will be further described in but not limited by the following examples.

EXAMPLE 1

Preparation of 4-(2,3-dihydroxypropyloxy)-4'-nitrostilbene a. 4-hydroxy-4'-nitrostilbene A mixture of 118 g of 4-nitrophenyl acetic acid, 122 g of 4-hydroxybenzaldehyde, 0.8 l of mesitylene and 0.2 l of piperidine was stirred for 90 minutes at 120° C. under an atmosphere of nitrogen. After cooling to 60° C. the reaction mixture was poured into a mixture of 1 l of 2N HCl and 1 l of petroleum ether (boiling point 80°-110° C.). Following filtration and washing with 2 l of water the crude product was dried and then crystallized from 2 l of ethanol (100%).

Obtained were 190 g of 4-hydroxy-4'-nitrostilbene having a melting point of 209° C.

b. 4-((2,2-dimethyl-1,3-dioxa-4-cyclopentyl)methyl)-4'-nitrostilbene

A mixture of 120.5 g of 4-hydroxy-4'-nitrostilbene, 69 g of anhydrous potassium carbonate, 143 g of 2,2-dimethyl-4-(4-methyl phenyl sulphonyloxymethyl)-1,3-dioxolane, prepared in accordance with the specification of K. Freudenberg and H. Hess in Liebigs Annalen der Chemie Vol. 448 (1926), p. 121, and 1 l of dimethyl formamide (DMF) was boiled for 30 minutes with refluxing. After cooling the reaction mixture was poured, with vigorous stirring, into 5 l of water. The precipitated crystals were filtered off and after-washed with 5 l of water. The crude product after drying was crystallized from 4 l of acetone. Obtained were 135 g of 4-((2,2-dimethyl)-1,3-dioxa-4-cyclopentyl)methyl)-4'nitrostilbene in the form of yellow acicular crystals having a melting point of 146°–147° C.

c. 4-(2,3-dihydroxypropyloxy)-4'-nitrostilbene

A solution of 135 g of 4-((2,2-dimethyl-1,3-dioxa-4-cyclopentyl) methyl)-4'-nitrostilbene, 15 g of paratoluene sulphonic acid monohydrate in 1 l of tetrahydrofuran (THF) and 100 ml of water was boiled with refluxing for 5 hours. After cooling the reaction mixture was neutralized with 10 ml of triethylamine. The resulting clear solution was concentrated by evaporation to a volume of about 0.5 l and subsequently poured, with vigorous stirring, into 5 l of water. The resulting precipitate was filtered off and after-washed with 5 l of water. The crude product after drying was crystallized from a mixture of 2 l of acetone and 0.5 l of n-hexane. Obtained were 105 g of 4-(2,3-dihydroxypropyloxy)-4'-nitrostilbene having a melting point of 147° C. and a clearing temperature of 152° C.

EXAMPLE 2

Preparation of 4-(2,3-dihydroxypropyloxy)-4'-cyanostilbene a 4-(2,2-dimethyl-1,3-dioxa-4-cyclopentyl)methyloxy) benzaldehyde A mixture of 122 g of 4-hydroxybenzaldehyde, 69 g of anhydrous potassium carbonate, 286 g of 2,2-dimethyl-4-(4-methyl phenyl sulphonyloxy methyl)-1,3-dioxolane, prepared in accordance with the specification of K. Freudenberg and H. Hess in Liebigs Annalen der Chemie, Vol. 448 (1926), p. 121, and 0.5 l of dimethyl formamide was boiled with refluxing for 60 minutes. After cooling, the reaction mixture was poured, with vigorous stirring, into 2.5 l of water. The precipitated crystals were filtered off and thoroughly washed with water. The crude product was recrystallized from isopropanol. Obtained were 150 g of 4-((2,2-dimethyl-1,3-dioxa-4-cyclopentyl) methyloxy)benzaldehyde with a melting point of 44°–47° C.

b. 4-(2,3-dihydroxypropyloxy)-4'-cyanostilbene

To a solution of 47.2 g of 4-( 2,2-dimethyl-1,3-dioxa-4-cyclopentyl)-methyloxy)benzaldehyde in 400 ml of dimethyl formamide were added 50.6 g of diethyl 4-cyanophenyl phosphonate, prepared in accordance with the specification of A. Franke et al. in Synthesis (1979), p. 712–714, and (in small portions) 10 g of sodium hydride, 60%-dispersion in mineral oil. The reaction mixture was stirred for 1 hour at room temperature and subsequently neutralized with diluted acetic acid. The resulting mixture was concentrated to a small volume, taken up in 1 l of dichloromethane, and washed with a 10%-aqueous solution of sodium bicarbonate and water. The organic layer was separated, dried on magnesium sulfate, and evaporated. The crude product, consisting of 65 g of almost pure 4-((2,2-dimethyl-1,3-dioxa-4-cyclopentyl)methyloxy)-4'-cyanostilbene was added to a mixture of 400 ml of tetrahydrofuran, 40 ml of water, and 10 ml of concentrated hydrochloric acid. The resulting mixture was boiled with refluxing for 2 hours. After cooling it was neutralized with triethyl amine, concentrated to a small volume, and poured, with vigorous stirring, into 2 l of water. The precipitated product was filtered off, dried in vacuo, and crystallized from a mixture of 100 ml of dimethyl formamide and 100 ml of ethanol. The yield was 42 g of pure 4-(2,3-dihydroxypropyloxy)-4'-cyanostilbene with a melting point of 172°–173° C.

EXAMPLE 3

Preparation of 4-(2,3-dihydroxypropyloxy)-2'-fluoro-4' nitrostilebene

2-Fluoro-4-nitrotoluene (commercially available) was converted with the use of N-bromosuccimimide into the intermediate 2-fluoro-4-nitrobenzyl bromide, and subsequently into diethyl 2-fluoro-4-nitrobenzylphosphonate, in accordance with the specification of D. H. Wadsworth et al. in the Journal of Organic Chemistry, Vol. 30 (1965) p. 680–685. The title compound was prepared by the same procedure as described in Example 2. Making use of 23.6 g of 4-((2,2-dimethyl-1,3-dioxa-4-cyclopentyl)methyloxy)benzaldehyde and 29.1 g of diethyl 2-fluoro-4-nitrobenzyl phosphonate there were obtained in all 21 g of 4-(2,3-dihydroxypropyloxy)-2'-fluoro-4'nitrostilbene with a melting point of 110° C. and a clearing temperature of 129° C.

EXAMPLE 4

General Preparation of NLO-Polyesters

To a mixture of 10 mmoles of monomeric diol (see Examples 1, 2 and 3), 3 ml of tetrahydrofuran, and 10 mmoles of freshly distilled diacid chloride (see Table 1) were added 3 ml of pyridine. The reaction mixture was boiled with refluxing for 1 hour and, after cooling, poured into 500 ml of water. The precipitated product was filtered off, washed thoroughly with methanol, and dried in vacuo at 50° C. The yields were almost quantitative.

TABLE 1

| Data on NLO Polyesters | | | | | |
|---|---|---|---|---|---|
| Mononers | | | | | Dhyp$^{(b)}$ in |
| Diol from Example No. | Diacid Chloride | $M_w{}^{(a)}$ | Tg (in °C.) | Tc (in °C.) | $10^{-11}$ m V |
| 1 | glutaryl | 4300 | 59 | 105 | 2.8 |
| 1 | adipoly | 4700 | 56 | 88 | 2.7 |
| 1 | suberyl | 8000 | 40 | 69 | 2.5 |
| 1 | sebacyl | 12000 | 42 | 62 | 2.4 |
| 2 | adipoyl | 4400 | 52 | 103 | 0.3 |
| 3 | adipoyl | 3400 | 41 | 63 | 2.7 |

$^{(a)}$The $M_w$ was determined by gel permeation chromatography, the calibration curve being plotted using a series of polystyrene standard samples of a known molecular weight.
$^{(b)}$Hyperpolarizability density.

$$Dhyp = \frac{\rho N_A}{M} \cdot \beta_o$$

$\rho$: Density, for which a value of $1.2 \times 10^6$ gm$^{-3}$ is taken
$N_A$: Avogadro+s number ($6 \times 10^{23}$ mol.$^{-1}$)
M: Molecular weight of the recurring unit in g mol.$^{-1}$
$\beta_o$: Molecular hyperpolarizability extrapolated to a frequency of zero in accordance with the publication by Katz et al. referred to above.

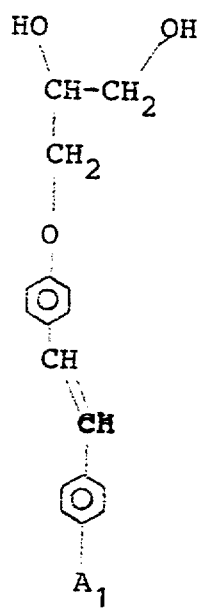

We claim:

1. A polyester comprised of the polyester polycondensation product of a diol and a reactant selected from the group consisting of (1) dicarboxylic acids and (2) derivatives thereof, said diol of the formula:

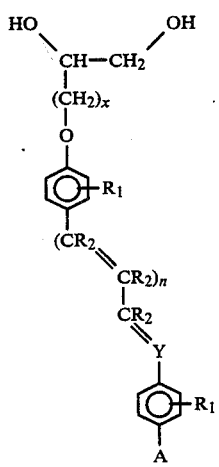

wherein
R₁ is halogen, $R_2$, $OR_2$, $COR_2$, $COOR_2$, CN[B] or $CF_3$;
$R_2$ is H or an alkyl group having 1-3 carbon atoms;
Y is $CR_2$, C—CN or N;
A is CN, $NO_2$, $CH=C(CN)_2$,

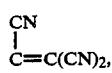

or $CF_3$;
n is 0-4; and
x is 0-6.

2. A polyester according to claim 1, wherein the reactant is an aliphatic diacid.

3. A polyester according to claim 1, wherein the dicarboxylic acid derivative is selected from the group consisting of a adipoyl chloride and glutaryl chloride and the diol is of the formula

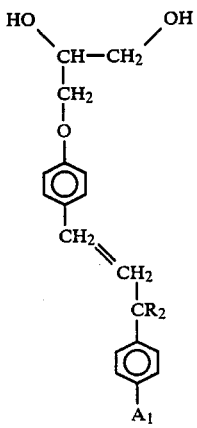

wherein $A_1$ is CN or $NO_2$.

4. An optical waveguide comprised of a polyester of claim 1.

5. An optical waveguide comprised of a polyester of claim 2.

6. An optical waveguide comprised of a polyester of claim 3.

7. A medium for optical storage comprised of a polyester of claim 1.

8. A medium for optical storage comprised of a polyester of claim 2.

9. A medium for optical storage comprised of a polyester of claim 3.

* * * * *

UNITED STATES PATENT AND TRADEMARK OFFICE
CERTIFICATE OF CORRECTION

PATENT NO. : 4,959,448
DATED : September 25, 1990
INVENTOR(S) : Wreesman, Carel T.J., et al.

Page 1 of 2

It is certified that error appears in the above-indentified patent and that said Letters Patent is hereby corrected as shown below:

Please change the formula of claim 3 to read:
(see attached page.)

Signed and Sealed this

Thirtieth Day of May, 1995

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 4,959,448
DATED : September 25, 1990
INVENTOR(S) : Wreesman, Carel T.J., et al.

Page 2 of 2

It is certified that error appears in the above-indentified patent and that said Letters Patent is hereby corrected as shown below: